Patented Oct. 3, 1950

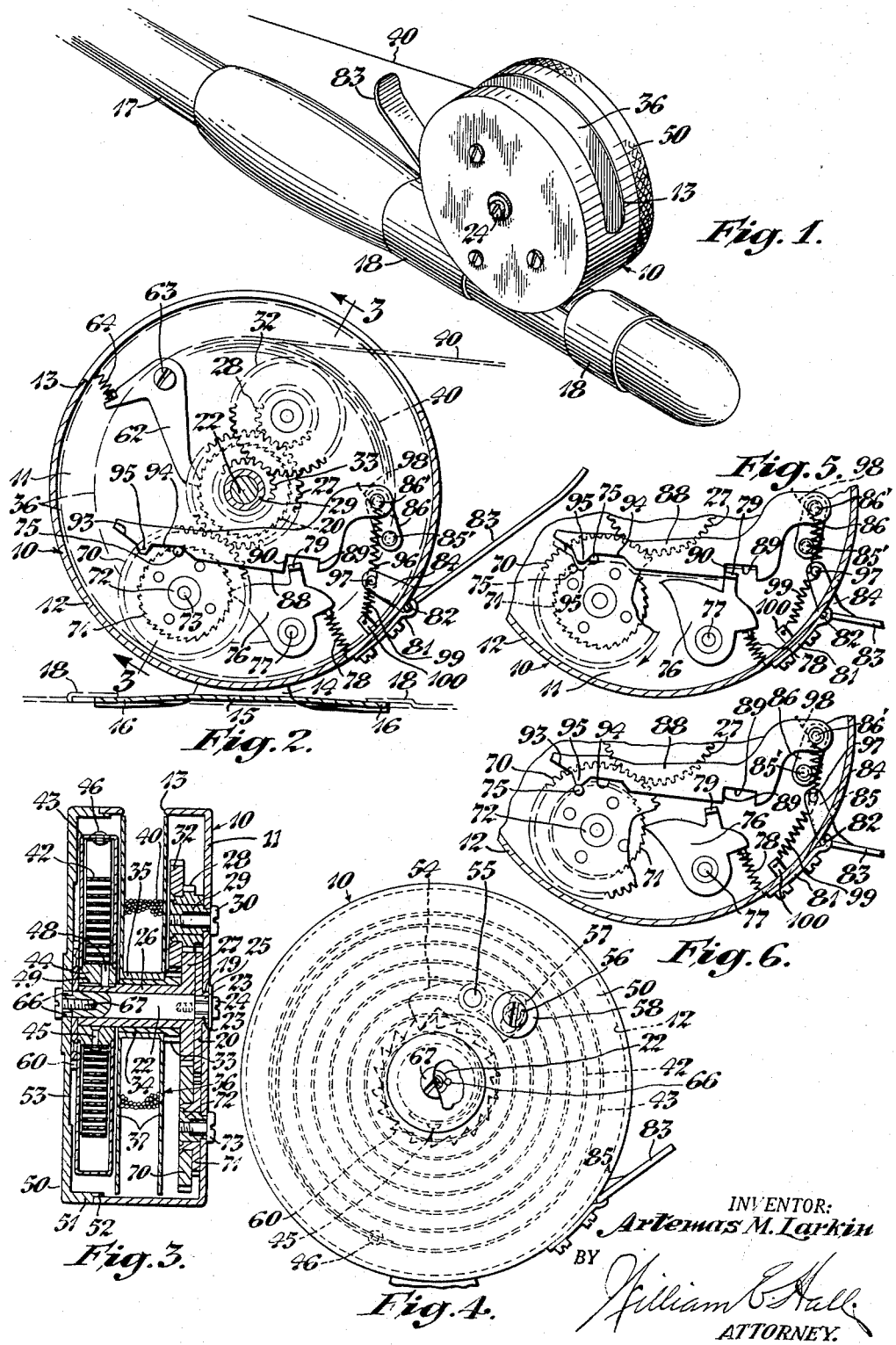

2,524,451

UNITED STATES PATENT OFFICE 2,524,451

FISHING REEL

Artemas M. Larkin, Glendale, Calif.

Application January 18, 1947, Serial No. 722,867

7 Claims. (Cl. 242—84.3)

This invention relates generally to take-up reels, and particularly to an improved automatic fishing reel for winding up the fishing line. The invention is concerned primarily with a fishing reel which is especially adapted for use on a fly-casting pole.

In conventional methods of fly-casting, it is customary to cast the line and its fly onto the water, and thereafter draw on the line to retrieve the fly by causing it to move in steps along the surface of the water toward the angler. The rod or pole is usually held in one hand, while the retrieving movements of the fly along the surface are effected with the free hand by drawing loops of the line laterally of the rod, these loops being subsequently wound on the reel by operating the same. Reels have been proposed in which the line is automatically wound on the reel-spool or drum by a coiled wind-up spring incorporated in the reel, the spring being tensioned by the action of stripping the line from the reel by hand as the cast is being accomplished. In such reeling devices, the spring acts to turn the spool or drum in a direction to wind the line thereon, such rotation being controlled by a manually-operated brake mechanism. Devices of this type are extremely difficult to control since it is well-nigh impossible to determine accurately the amount of line being wound onto the spool or to judge the location of the bait end of the line in the water. That is to say, it is desirable that the bait be moved through relatively short distances to attract the fish, and this is accomplished either by flipping the rod or actuating the line with the free hand. In fly-fishing, it is the usual practice to draw the fly along the surface of the water toward the angler by drawing successive loops in the line with the free hand, and, after each looping of the line, the length of the line in the loop is wound on the reel-spool by manually actuating the reel. It is impossible to accurately control such winding of the line on the spools of previous types of automatic reels because the retrieving of the line by the reel is not limited to the lengths of the loops mentioned above, and for this reason such reels are impractical, especially for fly-casting purposes. It will be apparent that unless the coiling of the line be limited to substantially that of the successive loops there is the possibility that the reel may take in all the line, and this may result in the fly being stripped from the line, or breaking of the tip of the rod. Moreover, when the entire length of the line is coiled on the reel-spool, it must be rethreaded along the rod and a new fly tied to the line. It is therefore the primary object of this invention to provide an automatic fishing reel which is particularly adapted for fly-casting and which functions to coil only the short lengths of the line successively looped by the angler without the danger of the reel taking in all the line.

It is another object to provide an automatic reel which permits the fly to be cast to any desired distance by the conventional fly-casting method, but normally limits the take-up of the line to short metered windings, so as to take in the relatively short loops formed periodically when retrieving the fly.

Another object is to provide an automatic reel of the character referred to in which a motor spring is employed as the motive power for rotating the spool or drum, and in which manually-operated means are provided for tensioning the spring, so that the casting of the line is not relied upon for this purpose and the strength of the spring may be readily controlled regardless of the length of line being utilized for casting.

Another object is to provide an automatic reel of the type indicated having manually releasable detent means normally operative to withhold the wind-up spring from operation, said detent means being released to permit rotation of the reel-drum under the influence of the spring and having means incorporated therein for arresting the rotation of the drum after a predetermined number of revolutions of the drum whereby to effect the winding of a measured amount of the line on the drum.

Another object is to provide a reel of the character specified having manually rotatable means for winding or tensioning the take-up spring, and ratchet means normally connecting the manual means and the spring, said ratchet means being adapted to be released to permit unwinding the line from the drum without tensioning the spring.

Further objects of the invention are set forth in the following specification which describes a preferred embodiment thereof, by way of example, as illustrated by the accompanying drawing. In the drawing:

Fig. 1 is a perspective view of the improved automatic reel, showing it applied to use with a fishing pole or rod;

Fig. 2 is an enlarged sectional view through the reel device, taken on a median plane;

Fig. 3 is a cross-sectional view through the device, taken on line 3—3 of Fig. 2;

Fig. 4 is a side elevational view of the device; and,

Figs. 5 and 6 are fragmentary sectional views, showing two positions of the control mechanism.

Referring to the drawing in detail, the improved reel device comprises a cylindrical casing or housing 10 having a circular end wall 11 and an annular side wall 12. At one side of the housing 10 its side wall 12 is provided with an elongated opening 13, and at the side opposite the opening with a boss 14 to which a sheet metal element 15 is secured. The element 15 has tongues 16 at its ends, which are adapted to be disposed against the side of a fishing pole, such as shown at 17 in Fig. 1, and to be held thereagainst by the usual locking sleeves 18 on the pole.

The end wall 11 of the housing 10 has a central aperture for receiving the hub 19 of a ratchet disc 20, which is rotatable within the housing against the inner face of the end wall. The ratchet disc 20 has an axial hole for receiving the reduced end of a spindle 22, which is keyed rotatively therewith by suitable means such as the pair of pins 23, shown in Fig. 3. The spindle 22 is connected to the ratchet disc 20 by means of a screw 24 and washer 25. Rotatable on the spindle 22 is a sleeve 26 which forms the hub of a spur gear 27, hereinafter referred to as the driving gear. The driving gear 27 meshes with a smaller gear 28 rotatable on a tubular stud 29 held against the inner face of the housing by means of a beaded screw 30. Fast on the hub of the gear 28 is a gear 32 of approximately the same size as the driving gear 27, the two gears 28 and 32 being hereinafter referred to as the compound gear 28, 32. The compound gear 28, 32 is adapted to rotate a relatively small pinion gear 33 formed at the inner end of a tubular bushing 34, which is free to rotate on the hub 26 of the driving gear 27. The bushing 34 has a press fit in the bore of the barrel 35 of a reel-spool or drum 36 having flanges 37. The drum 36 is adapted to support the coils of the fishing line 40 which is wound on its barrel 35. It is apparent from the above that when the sleeve-like hub 26 is rotated, by means to be later described, the spool or drum 36 will be rotated at an increased speed through the medium of the train of gears 27, 28, 32 and 33.

The driving gear 27 is adapted to be driven by a motor spring 42, which is disposed within a hollow cylindrical sheet metal casing 43. As shown in Figs. 3 and 4, the spring 42, which resembles a clock spring, is coiled around an axial driving sleeve 44 forming the center of the casing 43, but rotatable with respect to the casing. The inner convolution of the spring is riveted to the sleeve at 45, and the outer convolution is riveted to the inner surface of the peripheral wall of the casing, as indicated at 46. The driving sleeve 44 is keyed rotatively to the hub 26 of the driving gear 27 by means of a pin 48 on the sleeve engageable in a keyway 49 in the hub. It is thus seen that when the spring 42 is tensioned by turning the casing 43 and the casing then held against rotation, the spring will act through the driving sleeve 44 and pin 48 to rotate the driving gear 27, and through the train of gears described above the reel-drum 36 will be rotated at a relatively high rate of speed.

The casing 43 is rotated to tension the motor spring 42 by means of a disc 50, which serves as a cover for closing the open end of the housing 10. The disc 50 has a peripheral flange 51 which is knurled on its outer surface and which forms a continuation of the circular wall 12 of the housing 10, and the flange is provided with an annular lip 52 engaging the interior of the wall 12 to adapt the disc to rotate with respect to the housing. The inner face of the disc 50 is recessed at 53, and arranged in the recess is a pawl 54 which is pivoted on a pin 55. A pin 56 on the pawl 54 projects outwardly through an elongated opening 57 in the disc and carries a button 58 on its outer end. The pointed end of the pawl 54 is adapted to engage with the teeth of a ratchet 60 fastened to the outer side of the spring casing 43, so that rotation of the disc 50 in counterclockwise direction, as viewed in Fig. 4, will cause the casing to be rotated in the same direction to wind up and thus tension the motor spring 42. Retrogressive movement of the spring casing 43, which would result in unwinding the spring 42, is prevented by means of a check-pawl 62 pivoted on a screw 63 held in the wall 11 of the housing 10. The pawl 62 has a pointed end which is maintained in engageable relation with the teeth of the ratchet disc 20 by a spring 64.

The forward end of the spindle 22 is reduced in diameter, and this end passes through an axial hole in the disc 50 and is keyed rotatively therewith by means of a pair of pins 66. The spindle 22 and disc 50 are connected together by means of a screw 67.

The driving gear 27 meshes with a gear 70 fast on the hub of a ratchet wheel 71, which is rotatable on a tubular stud 72 fastened to the wall 11 of the housing 10 by means of a screw 73, see Fig. 3. The gear 70 has a control pin 75 projecting laterally from its forward face. A pawl 76 is pivoted on a pin 77 held in the wall 11 of the housing 10 and has a pointed end engageable with the teeth of the ratchet wheel 71. The pawl 76 is normally held in engagement with the ratchet wheel 71 by a spring 78 and has a bent finger 79. Since the gear 70 is prevented from rotating in clockwise direction and the driving gear 27 is prevented from rotating in counterclockwise direction by the pawl 76, and because the driving gear and the driving sleeve 44 are both connected rotatively with the sleeve, the inner convolution of the motor spring 42 will be held stationary as the disc 50 is rotated in counterclockwise direction, as viewed in Figs. 3 and 4, and the spring 42 will be coiled and thus tensioned. During the rotation of the disc 50 in coiling the spring 42 the spindle 22 and its attached ratchet disc 20 are rotated. The pawl 62 engages the ratchet disc 20 so that the spring 42 is held in its coiled condition until it is permitted to unwind by means to be next described.

Pivoted in the arcuate end of a sheet metal bracket 81 attached to the outer circular surface of the housing 10 is the cross-bar 82 of a control lever 83. The lever 83 has a finger 84 which projects into the housing 10 through a slot 85. Pivoted on a pin 85' held in the wall 11 of the housing 10 is a relatively short arm 86, to the upper end of which is pivoted, by means of a pin 86', sear 88, which extends transversely within the housing in overlying relation to the pin 75 and the finger 79. In its bottom edge the sear 88 has a slot 89 in which the finger 79 is disposed. One side of the slot 89 provides a shoulder 90 which is used for a purpose to be later explained. Adjacent its free end the sear 88 is cut away on its lower edge to provide a cam face 93 and a recess 94, the metal between the cam face and recess providing a downwardly extending lobe 95.

A coil spring 96 has one of its ends connected to the pin 86' and its other end joined to a pin 97 carried by the finger 84 of the lever 83. The spring 96 is adapted to be shifted laterally across center, that is, across the pivot pin 85' from the position shown in Fig. 2 to that illustrated in Fig. 5, and vice versa, as the operating lever 83 is operated in opposite directions. As the spring 96 is moved across center, it acts to pivot the arm 86 on its pivot 85' to shift the sear 88 lengthwise for the purpose to be hereinafter explained. A light spring 98 coiled around the pin 86' has one of its ends engaging the upper edge of the sear 88 and its other end engaging the side of the arm 86, and functions to normally tilt the sear downwardly with its free end resting upon the pin 75 (see Fig. 2). The operating lever 83 is normally held in the inoperative position, shown in Fig. 2, by means of a coil spring 99 having greater tension than the spring 96 and extending between the pin 97 and a pin 100 fastened to the circular wall 12 of the housing 10.

The improved reel operates in the following manner: Assuming that the reel is mounted on the fly rod 17 and that its parts are in the positions shown in Figs. 1 to 4, to withdraw a desired amount of the line 40 from the reel dum 36 the finger piece 58 is first moved inwardly toward the axis of the reel to disengage the pawl 54 from the ratchet 60, and since the spring casing 43, spring 42, sleeve 44, sleeve 26, and gear 27 are free to rotate, the drum 36 also may turn to permit unwinding of the line therefrom. After a selected length of line has been unwound from the drum 36 for fly-casting purposes, the pawl 54 is reengaged with the ratchet 60. The spring 42 is then tensioned by rotating the disc 50 in counterclockwise direction. As the disc is thus rotated, the pawl 54, acting through the ratchet 60, turns the spring casing 43 in the same direction, and, because the sleeves 44 and 26 are prevented from rotating in counterclockwise direction by the engagement of the pawl 76 with the ratchet disc 71, the spring 42 will be caused to wind up around the sleeve 44. During this rotative movment of the disc 50 and spring casing 43, the pawl 62 will engage the ratchet disc 20, which is operatively connected to the disc 50 by the spindle 22, to prevent reverse rotation of the disc 50 and unwinding of the spring 42 when the disc 50 is subsequently released by the operator. The fishing pole is then ready for use and the line, together with its fly, may be cast in the usual manner, that is, by impelling it forward in the manner of a whip. The casting of the line will have no effect upon the setting of the reel parts, it having been explained that the spring 42 is prevented from unwinding by the pawl 76.

After the fly line is cast and the fly rests upon the surface of the water, it is the usual practice to retrieve the line, that is, to draw it toward the angler, and thus simulate the movement of an actual fly for the purpose of attracting the fish. As explained before, this movement is usually accomplished by drawing successive loops of the line sidewise of the pole, after which the lengths of line in the loops are wound onto the reel-drum or spool, this operation being effected by manually rotating the reel and repeated as many times as are deemed necessary. In the present improved reel, means are provided for automatically winding the relatively short lengths of the line as looped by the angler in the usual manner. To operate the reeling device to accomplish this result, it is only necessary to depress the control lever 83, as shown in Fig. 5. As the lever 83 is tilted downwardly, its finger 84 is tilted upwardly and toward the right against the tension of the spring 99, and thus the spring 96 is shifted across center toward the right to pivot the arm 86 in the same direction with a snap action. The arm 86 thus functions to draw the sear quickly toward the right to cause its shoulder 90 to engage the finger 79 of the pawl 76 to pivot the latter in clockwise direction against the action of the spring 78 and thus withdraw the pointed end of the pawl from the teeth of the ratchet wheel 71. Upon disengagement of this detent pawl, the ratchet wheel 71, together with the gears 70, 27, 28, 32, and 33, are free to rotate and thus the motor spring 42 will become active. Rotation of the spring casing 43 with respect to the operating disc 50 is prevented by the pawl and ratchet 54, 60, and rotation of the disc 50 and its spindle 22 in clockwise direction is checked by the pawl and ratchet 62, 20. Consequently, the tensioned motor spring 42, in its effort to unwind, will rotate the sleeves 44 and 26 and driving gear 27 in counterclockwise direction and, through the medium of the gears 28, 32, and 33, the reel drum 36 will be rotated in counterclockwise direction at an increased rate of speed. In this manner the line 40 is drawn into the reel through the opening 13 and wound onto the drum 36.

Simultaneously with this automatic winding operation the gear 70 will be rotated in clockwise direction by the driving gear 27, and during this rotation of the gear 70, the control pin 75 is moved in a circular path through 360°. After the pin 75 moves out from under the sear 88 the latter may descend to the position indicated by dash lines in Fig. 5 under the action of the spring 98. However, as the pin 75 completes its circular travel it engages and rides along the cam face 93 of the sear 88 and thus pivots the sear upwardly, with the sear finally coming to rest upon the pin 75, as shown in Fig. 6. During the upward pivotal movement of the sear 88, its shoulder 90 is carried away from the finger 79 of the detent pawl 76, and thus the pawl is released thereby and permitted to snap into engagement with the ratchet 71 under the influence of the spring 78, as shown in Fig. 6. It is obvious, therefore, that further rotation of the drum 36 is checked, and the amount of line wound onto the drum is but a small part of the total length of line originally stripped off from the drum.

To reset the reel, the control lever 83 is released by the operator and the spring 99 then will act to simultaneously raise the lever 83 and shift the spring 96 across the pin 85' or toward the left to the position indicated in Fig. 2, thus causing the sear 88 to be returned to inoperative position with a snap action. The sear 88 is thus so positioned that the finger 79 of the pawl 76 is disposed in the slot 89 of the sear in readiness to be subsequently engaged by the shoulder 90, when the operation, explained above, is repeated, to draw in another measured length of the line. It will be understood that the handle 83 may be periodically operated to effect the retrieving of successive relatively short lengths of the line as long as the motor spring 142 remains tensioned, and if additional motive power is required the spring may be wound tighter by simply turning the disc 50 in the manner explained above. It will be apparent that the spring 42 may be tensioned also by maintaining the pawl 54 in engagement with the ratchet 60, to prevent rotation of the spring casing 43, and then withdrawing or unwinding the line 40 from the drum 36 to cause the spring to be wound from the inner end, instead of from the outer end as before explained, the result of winding the spring from either end being the same.

It will be observed from the foregoing that this invention provides an automatic fishing reel which is adapted to wind up predetermined measured lengths of the fishing line, such a reel being particularly adapted for use in connection with a fly-casting rod to automatically coil the lengths of line looped by the angler without the danger of the reel taking in all of the line which might result in stripping the fly from the line, breaking the tip of the rod, or coiling of the entire length of the line on the reel which would require rethreading of the line and tying of a new fly on the line. The improved automatic reel thus accomplishes a result unobtainable with other types of automatic reels employed heretofore. Moreover, in the present reel no braking means is necessary, and thus the possibility of the reel becoming inoperative, due to wearing of such braking surfaces, is avoided, and the reel will remain operative almost indefinitely with very little servicing except to occasionally lubricate its operating parts. The main parts of the reel device may be made from light weight material, such as aluminum, so that undue weight is not imposed upon the rod or pole to which the reel is attached.

Having thus described my invention in one form, what I claim is new, and desire to secure by Letters Patent, is:

1. A fishing reel, including: a housing adapted for attachment to a fishing pole; a drum rotatable in said housing and adapted to support a fishing line; spring-actuated means for rotating said drum in a direction to wind said line thereon, said spring-actuated means including a rotatable ratchet; a movable pawl normally engageable with said ratchet to withhold said spring-actuated means from operation; manually operable means for moving said pawl in a direction to cause it to release said ratchet to permit operation of said spring-actuated means; and means on said ratchet engageable with said manually operable means after a predetermined extent of rotation of said ratchet, so as to cause said pawl to move in the opposite direction to re-engage said ratchet to withhold said spring-actuated means from further operation.

2. A fishing reel, comprising: a housing adapted for attachment to a fishing pole; a drum rotatable in said housing and adapted to support a fishing line; a wind-up coil spring in said housing; a train of meshing gears interposed between said spring and said drum and adapted to be rotated by said spring to rotate said drum in a direction to wind said line thereon; a ratchet rotatable with one of the gears of said train of gears; a spring-actuated pawl normally engageable with said ratchet to withhold the gears of said train from rotation; manually operable means for moving said pawl in a direction to cause it to release said ratchet to permit rotation of said gears; and means on said ratchet engageable with said manually operable means after a predetermined extent of rotation of said ratchet to permit said pawl to reengage said ratchet to withhold said gears and said drum from further rotation.

3. A fishing reel, comprising: a housing adapted for attachment to a fishing pole; a drum rotatable in said housing and adapted to support a fishing line; a wind-up coil spring in said housing; a train of meshing gears interposed between said spring and said drum and adapted to be rotated by said spring to rotate said drum in a direction to wind said line thereon; manually rotatable means for winding up said spring to tension the same; holding means for maintaining said spring in its tensioned condition; a ratchet rotatable with one of the gears of said train of gears; a spring-actuated pawl normally engageable with said ratchet to withhold the gears of said train from rotation; manually operable means for moving said pawl in a direction to cause it to release said ratchet to permit rotation of said gears; and means on said ratchet engageable with said manually operable means, after a predetermined extent of rotation of said ratchet, to permit said pawl to reengage said ratchet to withhold said gears and said drum from further rotation.

4. A fishing reel as defined in claim 3 in which said manually rotatable means includes a ratchet-wheel operatively connected to said wind-up spring; a disc rotatable on said housing; and a releasable pawl carried by said disc and engageable with said ratchet-wheel.

5. A fishing reel as defined in claim 3 in which said manually rotatable means includes a ratchet-wheel operatively connected to said wind-up spring; a manually rotatable disc on said housing; and a pivoted pawl carried by said disc and normally engaged with said ratchet-wheel; said pawl being adapted to be pivoted in a direction to release said ratchet-wheel to permit said drum to rotate in a direction to cause said line to be unwound therefrom.

6. In an automatic fishing reel, the combination of: a housing adapted for attachment to a fishing pole; a drum rotatable in said housing and adapted to support a fishing line; a wind-up coil spring in said housing; a train of meshing gears interposed between said spring and said drum and adapted to be rotated by said spring to rotate said drum in a direction to wind said line thereon; manually rotatable means for winding up said spring to tension the same; a ratchet rotatable with one of the gears of said train of gears; a spring-actuated pawl normally engageable with said ratchet to withhold the gears of said train from rotation; a manually operable lever pivoted on said housing; a pivoted arm; a sear pivoted to said arm and disposed adjacent said pawl and provided with a shoulder adapted to engage said pawl when said sear is moved in one direction by said arm to withdraw said pawl from engagement with said ratchet to permit rotation of said gears; resilient means connected between said arm and said lever for pivoting said arm; and means on said ratchet engageable with said sear to move said sear in a direction to release said shoulder from said pawl after a predetermined extent of rotation of said ratchet to permit said pawl to reengage said ratchet to withhold said gears and said drum from further rotation.

7. In an automatic fishing reel, the combination of: a housing adapted for attachment to a fishing pole; a drum rotatable in said housing and adapted to support a fishing line; a wind-up coil spring in said housing; a train of meshing gears interposed between said spring and said drum and adapted to be rotated by said spring to rotate said drum in a direction to wind said line thereon; manually rotatable means for winding up said spring to tension the same; a ratchet rotatable with one of the gears of said train of gears; a spring-actuated pawl normally engageable with said ratchet to withhold the gears of said train from rotation; a manually operable lever pivoted on said housing; an arm pivoted in said housing; a sear pivoted on said arm and bodily movable within said housing, said sear having a shoulder; a spring connected between the manually operable lever and the free end of said arm, and adapted, upon pivotal movement of said lever, to shift across the pivot of said arm to pivot the latter with a snap action and bodily move said sear, pivotal movement of said lever in one direction acting through said spring and arm to move said sear in a direction to cause said shoulder to engage with and release said pawl from said ratchet to permit rotation of said gears and said drum under the influence of said winding up spring; and interengaging means on said ratchet and said sear for pivoting said sear in a direction to cause said shoulder to release said pawl after a predetermined extent of rotation of said ratchet, whereby to permit said pawl to reengage said ratchet to withhold said gears and said drum from further rotation.

ARTEMAS M. LARKIN.

REFERENCES CITED

The following references are of record in the file of this patent:

UNITED STATES PATENTS

| Number | Name | Date |
|---|---|---|
| 384,853 | Keller | June 19, 1888 |
| 520,517 | Corbin | May 29, 1894 |
| 1,861,221 | Martin et al. | May 31, 1932 |